US006344065B1

(12) United States Patent
Boulva

(10) Patent No.: US 6,344,065 B1
(45) Date of Patent: Feb. 5, 2002

(54) AIR FILTER SYSTEM FOR A VERTICAL AIR BLOWING FAN

(76) Inventor: Paul Boulva, 280 Chemin du Bois, Piedmont, Quebec (CA), J0R 1K0

( * ) Notice: Subject to any disclaimer, the term of this patent is extended or adjusted under 35 U.S.C. 154(b) by 0 days.

(21) Appl. No.: 09/695,831

(22) Filed: Oct. 26, 2000

(51) Int. Cl.[7] ............................................. B01D 46/52
(52) U.S. Cl. ........................ 55/471; 55/385.2; 55/472; 55/473; 55/493
(58) Field of Search ................................ 55/385.1, 385.2, 55/467, 471, 472, 473, 496, 501, 493

(56) References Cited

U.S. PATENT DOCUMENTS

| | | | |
|---|---|---|---|
| 3,838,556 A | * 10/1974 | Finger | 55/476 |
| 5,435,817 A | * 7/1995 | Davis et al. | 55/385.2 |
| 5,759,217 A | * 6/1998 | Joy | 55/385.1 |
| 5,762,667 A | * 6/1998 | Pippel et al. | 55/473 |
| 5,893,939 A | * 4/1999 | Rakocy et al. | 55/471 |
| 5,984,991 A | * 11/1999 | Glucksman | 55/471 |
| 6,001,145 A | * 12/1999 | Hammes | 55/471 |

* cited by examiner

Primary Examiner—David A. Simmons
Assistant Examiner—Minh-Chau T. Pham
(74) Attorney, Agent, or Firm—Swabey Ogilvy Renault; Guy J. Houle

(57) ABSTRACT

A vertical air blowing fan having an air filter is described. The vertical fan has an elongated housing provided with a foot support for maintaining the housing upright. The housing is provided with an air inlet opening and an air outlet opening. A cylindrical fan is provided in the housing for drawing ambient air in the inlet opening and out through the outlet opening in a substantially tangential path inside the housing to create a substantial airflow in an area outside the housing. A filter retention member secures a filter frame curved over and against the air inlet opening. The air filter membrane is removably engageable across the opening. The filter membrane is capable of holding its shape when held in position. The filter membrane is retained outwardly curved tight against the air inlet opening of the housing wall whereby the filter delineates a convex shape against the air being drawn into the inlet opening to resist deformation. It is noted that all the ambient air is accordingly drawn through the filter.

18 Claims, 5 Drawing Sheets

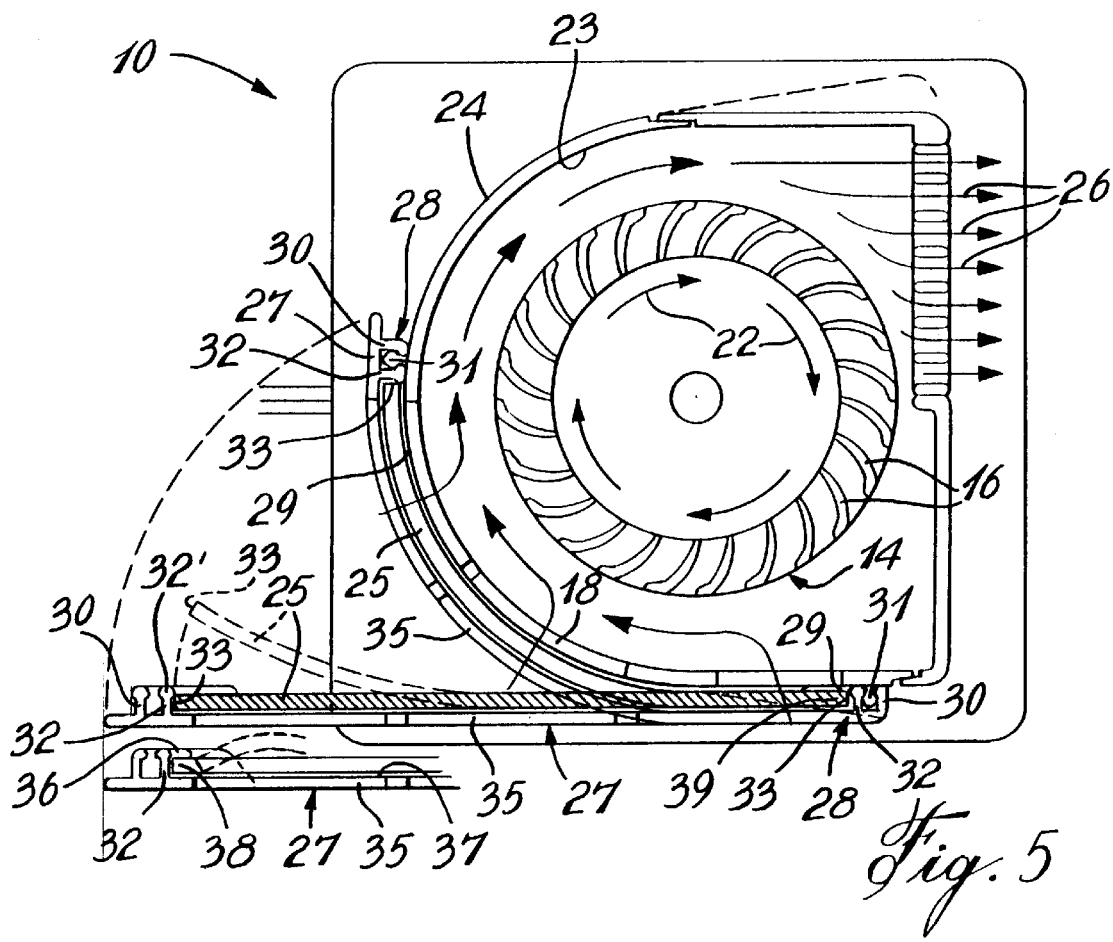
Fig. 5
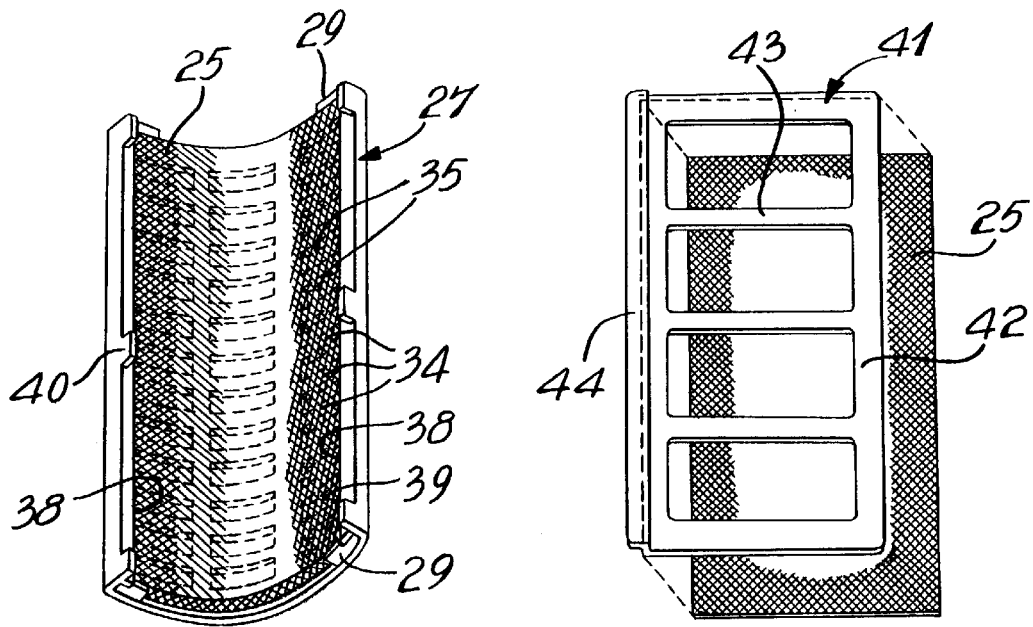
Fig. 6
Fig. 7

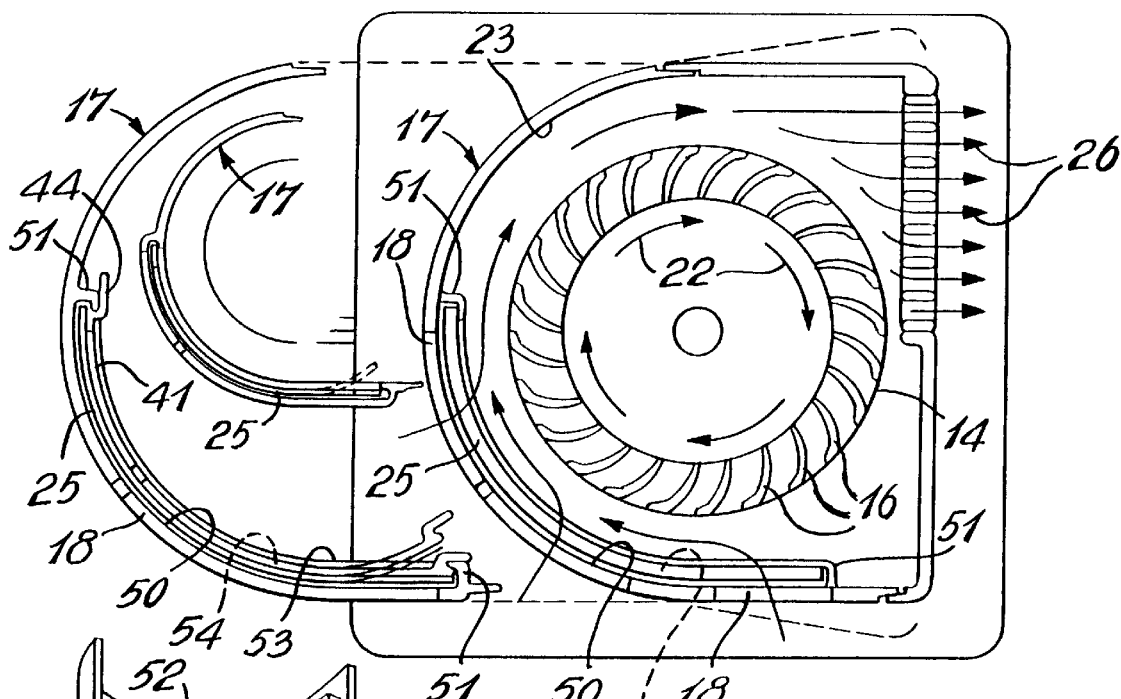
Fig. 8
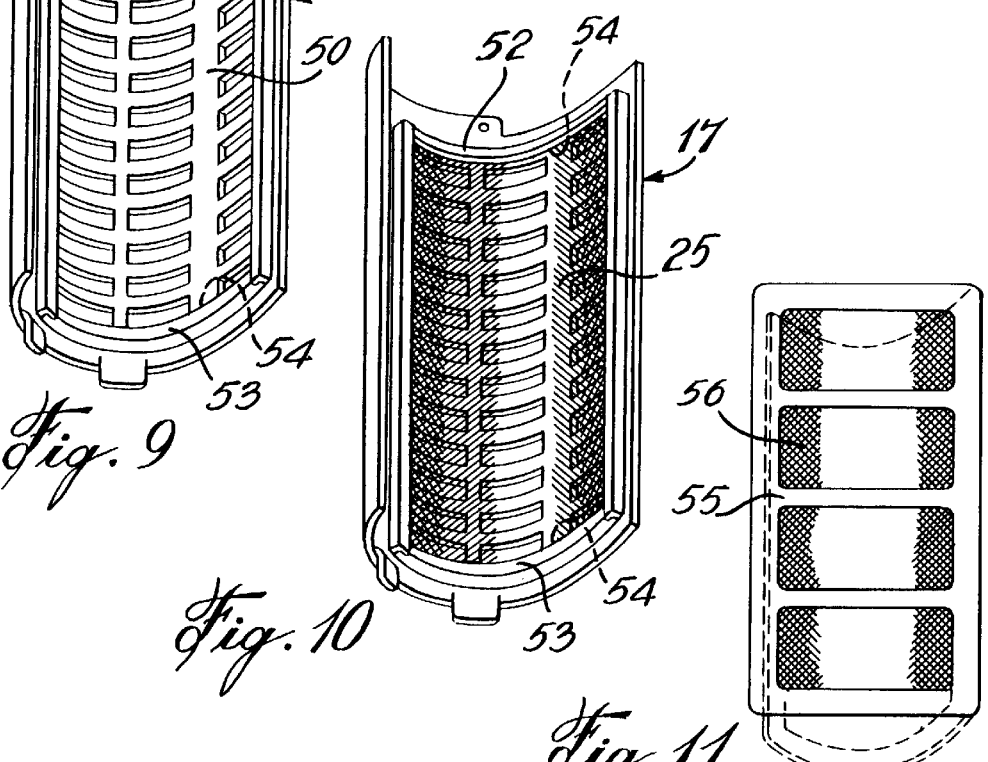
Fig. 9
Fig. 10
Fig. 11

AIR FILTER SYSTEM FOR A VERTICAL AIR BLOWING FAN

TECHNICAL FIELD

The present invention relates to a vertical blowing fan adapted with an air filter whereby to purify the ambient air ventilated by the vertical fan.

BACKGROUND ART

Vertical fans are known in the art and have a single function and that is to circulate ambient air in an area where the fan is located in order to create a vertical air current to ventilate and refresh a room or a person. This is particularly desirable during summer months when it is very warm in a room. These vertical fans usually have an elongated partly curved housing having a long cover in a rear portion thereof in order to provide access to its interior parts to permit the fan cylindrical rotor, the motor and the interior walls of the housings to be cleaned. The fans have a long cylindrical rotor fans having a plurality of curved vertical fan blades and these are somewhat difficult and time consuming to clean. These fans also displace dust and foreign particles in the ambient air and this is not desirable to maintain a room clean. It can also be irritating to an allergic person.

SUMMARY OF INVENTION

It is a feature of the present invention to provide a vertical fan with a filtration system whereby all the air drawn into the fan housing is filtered to purify the air as well as to circulate the air with a substantial air pressure in order to ventilate and refresh a room or a person. The filter captures dust particles in the air as well as pollen or other impurities and this without affecting the main function of the fan which is to ventilate and refresh the ambient air or a person. Accordingly, the vertical fan has a dual purpose.

Another feature of the present invention is to provide a vertical fan having a filtration system to render the environmental area of the fan much cleaner by eliminating dust from the air.

Another feature of the present invention is to provide a vertical fan having an air filter wherein the fan and the fan inner components remain clean for much longer periods of time thereby necessitating less frequent maintenance.

Another feature of the present invention is to provide a vertical fan and an air filter wherein the air filter is secured inside the fan and not accessible to children such that the impurities captured by the filter are not accessible to the fingers of children to transmit bacteria or other impurities.

Another feature of the present invention is to provide a vertical fan having a filter wherein the filter is not readily visible and wherein the tower fan housing maintains its aesthetic appearance.

Another feature of the present invention is to provide a vertical fan having an air filter and wherein the filter is easily accessible for cleaning or replacement and wherein the filter may be reusable thereby making the filtration system very economical.

Another feature of the present invention is to provide a vertical fan and an air filter system which is easy to assemble, disassemble, clean and economical and usable year-round.

According to the above features, from a broad aspect, the present invention provides a vertical fan having an air filter and comprising an elongated vertical housing which is maintainable upright on the support means. The housing is provided with an inlet opening in a curved rear wall section thereof. An air outlet opening is provided in the front wall section of the housing. A cylindrical fan rotor is disposed in the housing for drawing ambient air in the inlet opening and out through the outlet opening. The air is convected in a substantially tangential path through the housing and creates an airflow in an area outside the housing. Filter retention means is provided for removably engaging a filter membrane with a curved surface of the curved rear wall and across the inlet opening to totally cover the inlet opening. The filter membrane is capable of holding its shape when held in position against the curved surface. The curved surface is outwardly curved whereby the filter membrane delineates a convex shape against ambient air being drawn in the inlet opening.

BRIEF DESCRIPTION OF DRAWINGS

A preferred embodiment of the present invention will now be described with reference to the accompanying drawings in which:

FIG. 5 is a top section view similar to FIG. 3 but showing a modification of the housing about the inlet openings and wherein a filter membrane is attached over an outer surface of the inlet openings of the housing by means of a filter support retention frame and further illustrating an alternative modification of the filter support retention ribs;

FIG. 6 is a perspective view showing the filter membrane positioned in the retention frame;

FIG. 7 is a perspective view showing a flexible frame for retaining a thin filter membrane against the filter retention frame of FIG. 6;

FIG. 8 is a further section view, partly exploded, and showing alternative construction of the detachable rear wall of the tower housing and wherein a filter membrane is attached over an inner surface of the inlet openings of the detachable rear wall by means of a filler support retention frame;

FIG. 9 is a perspective view showing the inside construction of the detachable rear wall having retention and positioning means for the filter membrane;

FIG. 10 is a view similar to FIG. 9, but showing the filter membrane positioned against the inlet openings in the rear wall and secured by the filter retention means; and FIG. 11 is a perspective view of an alternative construction of the filter membrane.

DESCRIPTION OF PREFERRED EMBODIMENTS

Figure 1:
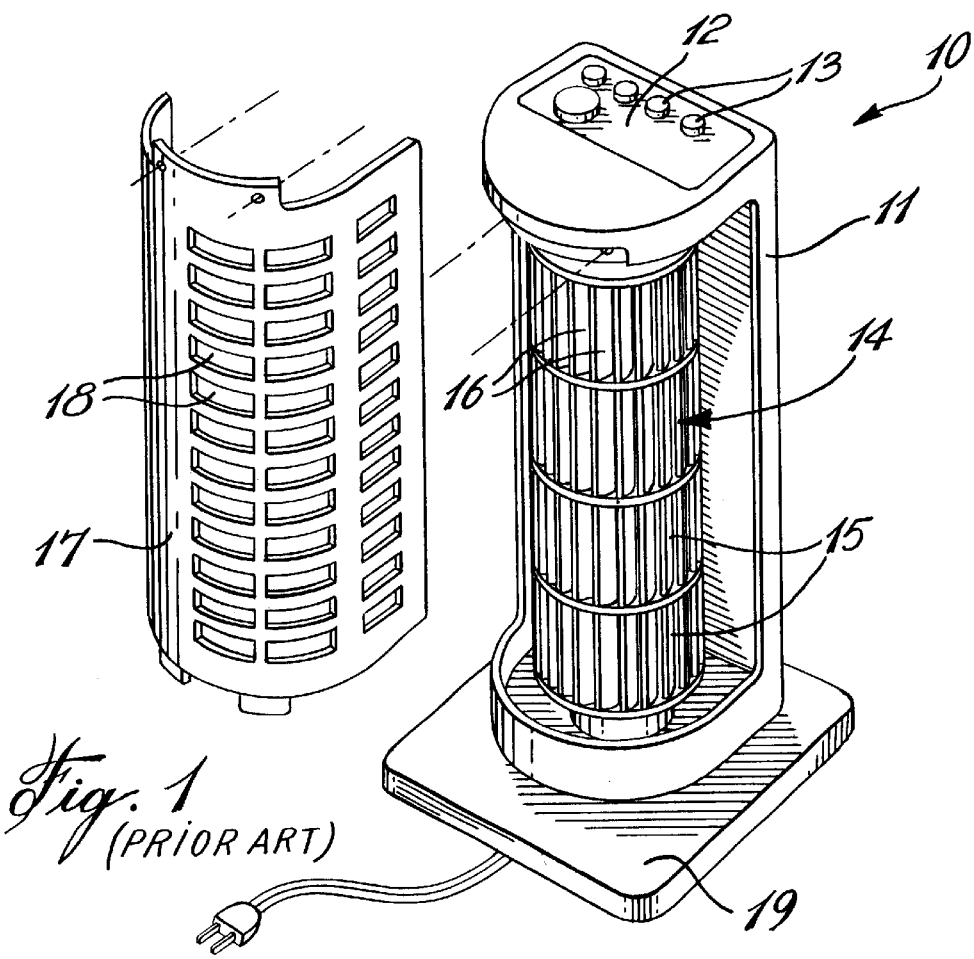
FIG. 1 is an exploded perspective view of a vertical fan of the prior art.
Figure 2:
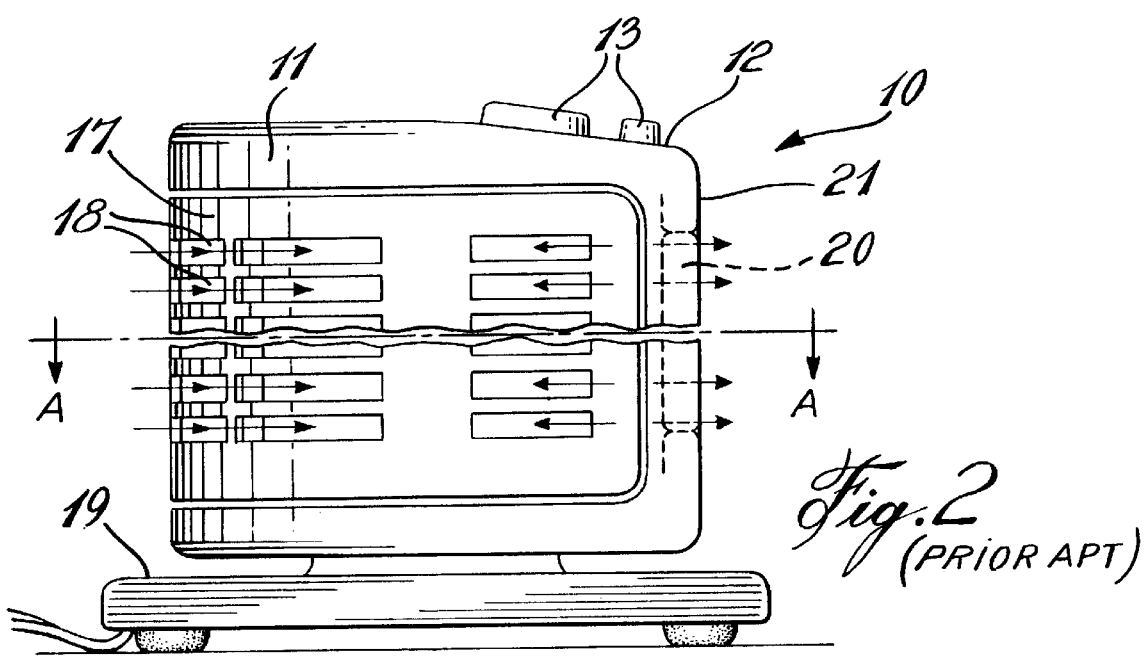
FIG. 2 is a side view which has been sectioned of the vertical fan of the prior art in an assembled condition.
Figure 3:
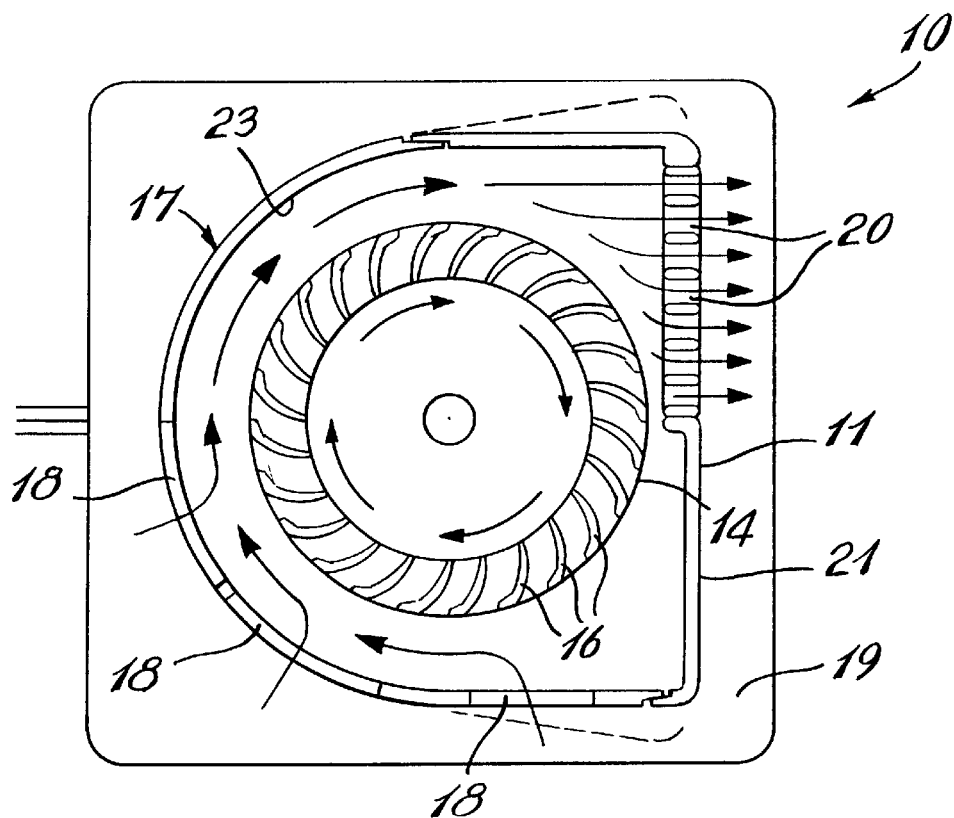
FIG. 3 is a top section view along section lines A—A of FIG. 2 illustrating the construction and air flow path inside the vertical fan when in operation.

Referring now to the drawings and more particularly to FIGS. 1 to 3, there is shown generally at 10, a vertical fan of the prior art and comprised essentially of an elongated housing 11 having a control panel 12 on a top end face thereof provided with the usual controls and switches 13 whereby to control the operation of the cylinder fan 14 supported vertically therein. The cylinder rotor fan 14 is usually constructed of similar sections 15, each of which is provided with a plurality of curved fan blades 16. A detachable rear panel 17 having a ribbed air inlet opening 18 is also provided for access to the interior of the housing to permit cleaning thereof. A flat support base 19 constitutes a support means to maintain the tower vertically upright on a support surface.

As shown in FIG. 3, the housing 11 is further provided with outlet openings 20 in a front wall 21 thereof whereby upon actuation of the fan 14, which rotates in a clockwise direction as indicated by arrows 22, air is drawn into the inlet opening 18 and flows against the inner curve wall 23 of the housing in a tangential path and out of the outlet openings whereby to ventilate a room with the ambient air. Accordingly, this vertical fan merely displaces air to provide a refreshing air current in a room or to draw cooler air from outside when the fan is positioned against a window opening. It is pointed out that, as the air flows through the fan, dust will accumulate along the inner walls of the housing and in the fan blades. Accordingly, it is periodically required to clean the interior of the housing and the cylindrical fan and this is done by removing the detachable rear panel 17 and cleaning the inside with suitable cleaning products and a vacuum cleaner.

Figure 4:
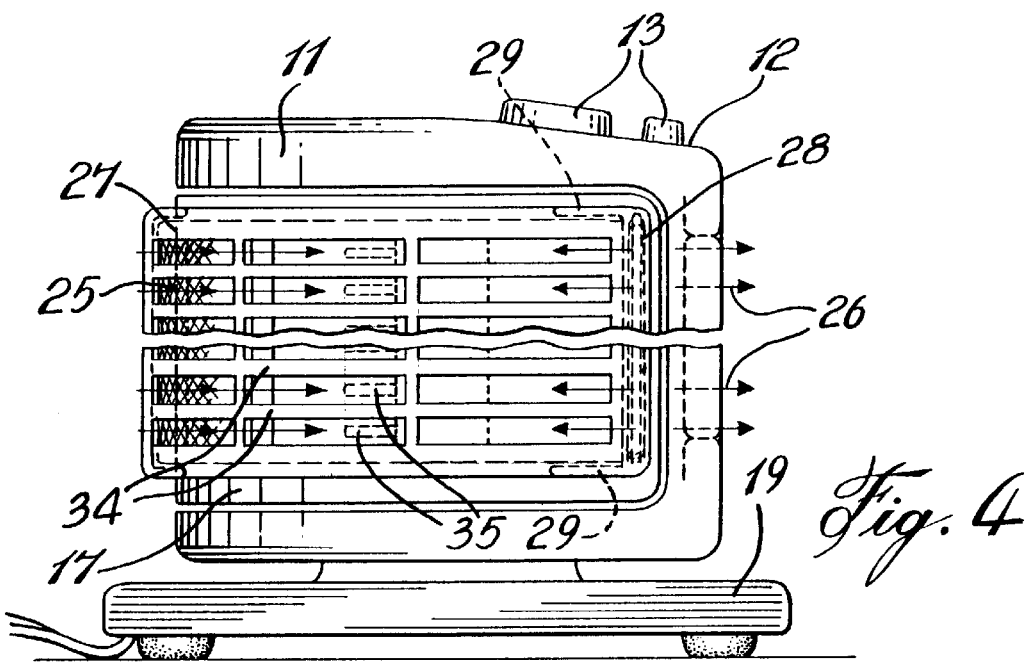
FIG. 4 is a side view similar to FIG. 2 but wherein a filter membrane has been installed rearwardly of the inlet openings.
Figure 12:
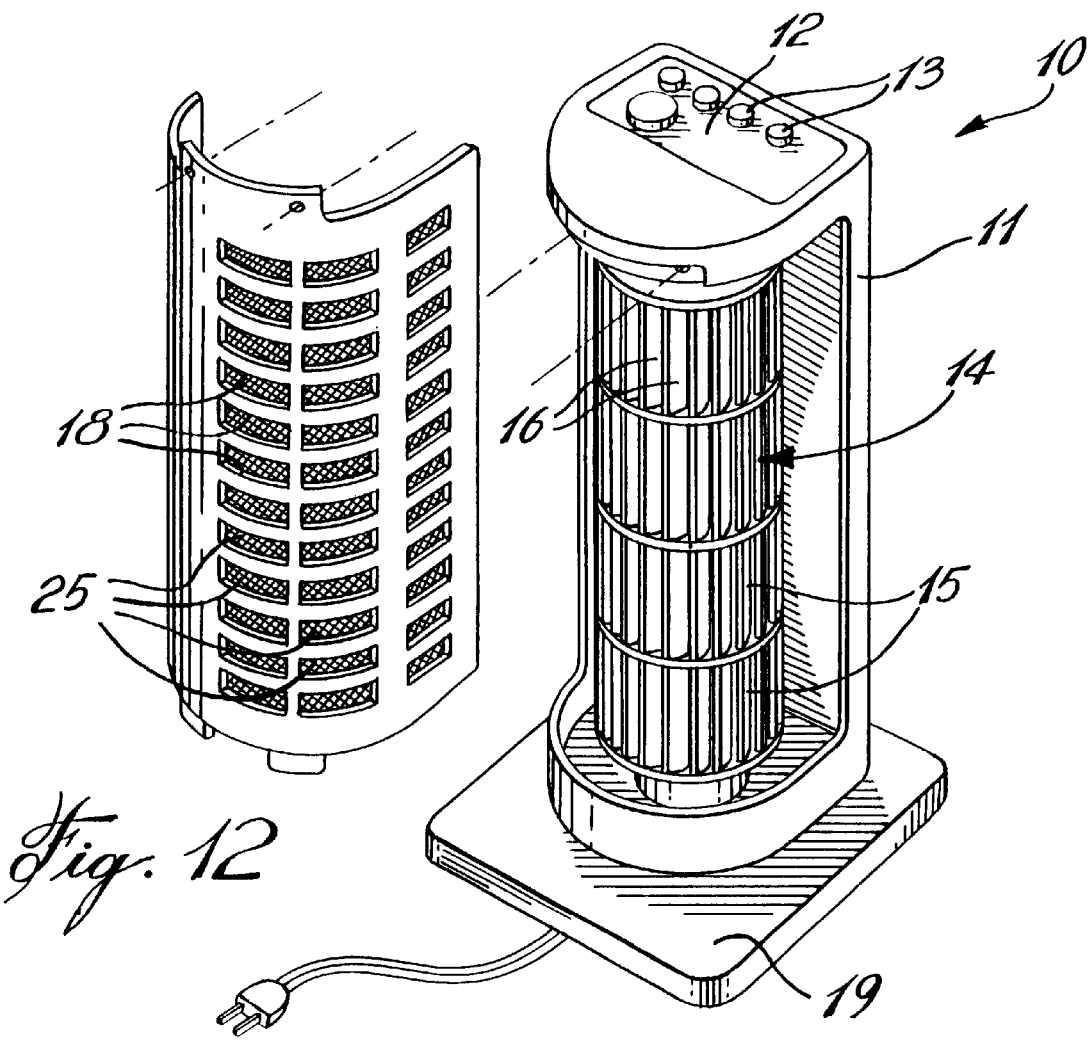
FIG. 12 is an exploded perspective view of a vertical air blowing fan incorporating the air filter system of the present invention.

With reference now to FIGS. 4, 5 and 6, there will be described an embodiment of the improvement of the vertical fan 10 and comprising the positioning of an air filter membrane 25 against the air inlet opening 18 whereby to filter impurities from the ambient air being drawn and circulated through the tower fan. The filter captures air impurities and the air flowing out of the housing, as illustrated by arrows 26, is purified air. As herein shown the filter membrane 25 is retained against an outer surface 24 of the rear wall over the opening 18 by retention means, herein a curved filter retention frame 27 when clamped over the inlet opening by clamping means 28.

The curved filter retention member is constituted by a flat flexible plastic retention frame having vertical ribs 28 and horizontal filter positioning wall sections 29. The clamping means 28 is constituted by a pair of opposed rear side channels 30 integrally formed with the ribs for clamping retention with a male projecting rib 31 formed with the tower housing on opposed vertical sides of the opening 18. Accordingly, the filter retention frame is easily attachable and removable over the opening in a snap-fit fashion.

The inner rib 32 of the channels 30 constitutes a holding means to retain the filter membrane 25 against the inner surface of the filter holding or locating frame which is herein constituted by the frame 27 which is clampingly engaged over the opening. However, as will be described later with reference to FIG. 8, this filter holding means can also be constituted by retention ribs formed in an inner surface of the detachable rear panel to each vertical side of the inlet opening. The inner ribs 32 are spaced apart a predetermined distance whereby the filter membrane, when disposed thereacross, will have its outer edges 33 in frictional contact with the inner ribs 32 and preferably, but not exclusively, in pressure contact therewith. That is to say, the filter will be slightly wider than the distance between the inner ribs whereby the membrane will be under slight compression to achieve good frictional retention fit, although as shown in FIG. 5, the filter membrane 25 is captive between the outer surface 24 of the fan housing and the inner wall of the retention frame 27.

When the filter retention frame 27 is in position on the fan housing as shown in FIG. 5, the filter is outwardly curved under pressure against the air inlet opening grid. Thus, the filter delineates a convex shape against the air being drawn in the inlet opening to offer resistance against the compression force created by the air current being drawn through the filter. The resistance in the filter membrane also acts against the compression force so that the filter is not dislodged or deformed during operation of the fan at its maximum fan speed.

As shown in FIGS. 4, 5 and 6, the filter membrane 25 is of rectangular shape to properly fit in its retention frame 27 and sized to cover the entire inlet opening 18. The retention frame has a plurality of ribs 34 defining a plurality of slot openings 35 therebetween. Accordingly, the filter is not very visible from the outside of the filter retention frame 27 and the ribs 34 offer protection preventing children from placing their fingers in contact with the dust accumulated on the filter membrane. It also provides for a good support of the filter membrane and also facilitates vacuuming the accumulated dust from the outside surface of the filter membrane without the removal of the retention frame.

As shown in the lower left hand corner of FIG. 5, the abutment inner rib 32 has an enlarged head 32' at a top end thereof to provide a lip for retention of the filter membrane. It may also be provided with an upper inwardly projecting rib 36 spaced from the inner surface 37 of the filter retention member 27 to define thereunder a filter retention channel 38 to receive a vertical side edge portion 39 of the filter membrane 25 in retention therein. It is pointed out that as the compression force of the air acts upon the membrane this force will be applied along the edges of the filter membrane and against the retention ribs 32, see FIG. 5.

The filter retention member 27 may also be a rigidly formed member, as shown in FIG. 6, having projecting ribs 40 for clamping retention within suitable retention means formed on opposed sides of the inlet opening 18.

FIG. 7 shows a further embodiment wherein a flexible frame 41 is provided to retain a thin filter membrane 25 in good clamping retention within the channels 38 or between the inner ribs 32 of FIG. 5. As shown in FIG. 5, the inner ribs 32 have a top circular ridge 32' to provide a projecting edge for better clamping retention. This flexible frame can be retained under these ridges and compress the filter membrane under the contour frame members 42 and spaced transverse rib frame members 43. This flexible frame may also be provided with a finger gripping rear projection 44 for ease of removal and installation. This flexible frame 41 is preferably for use with the embodiment of FIG. 8 which will now be described.

With reference to FIGS. 8, 9, 10 and 12, there is shown a further embodiment and wherein the filter membrane 25 is securable inside the detachable rear panel 17. As hereinshown, the filter retention member is in fact the detachable rear panel 17 and the curved filter retention member is the inner surface 50 of the rear panel 17. The filter holding means is constituted by the straight abutment ribs 51 disposed along opposed vertical sides of the air passage section or inlet opening 18 of the rear panel 17. These abutment ribs are spaced apart a predetermined distance to retain the filter membrane in snug fit therebetween. As shown in FIGS. 9 and 10, there may also be provided an upper inwardly projecting rib 52 as well as a lower projecting rib 53 spaced from the inner surface 50 of the panel 17.

The ribs as hereinshown also define retention channels 54 thereunder whereby to receive the lower and upper side edge portions of the filter membrane 25 in retention in these channels. The rectangular shape filter membrane is dimensioned for close friction fit with at least the vertical ribs. It is pointed out that the filter membrane is a homogeneous flat flexible sheet of foam or synthetic air filtering material which is preferably washable and reusable. Alternatively, the filter membrane can be constituted by a composite filter sheet as shown in FIG. 11 and having a flexible frame 55 to which is secured a filter sheet 56 by a suitable securing means, such as glue. These types of filters are usually discarded after use but can be vacuum cleaned.

In summary, the free-standing vertical fan as herein described provides a means for filtering air as well as circulating air. The air exiting the fan is purified air and by utilizing these fans in an environment, it cleans the air in that environment leaving less dust deposits and extracting pollen or harmful products such as cigarette smoke from the air. Such fans are also very useful in bedrooms for people who have allergies. The vertical fan is also maintained clean for long periods of time and the filters are easily removable and replaceable or cleanable. Such tower fans can now be used all year round.

It is also pointed out that it is within the ambit of the present invention to cover any obvious modifications of the preferred examples of the embodiment described herein, provided such modifications fall within the scope of the appended claims.

I claim:

1. A vertical fan having an air filter and comprising an elongated housing having support means for maintaining same upright, an air inlet opening in a curved detachable rear wall section of said housing, an air outlet opening in a front wall section of said housing, a cylindrical fan in said housing for drawing ambient air in said inlet opening and out through said outlet opening, said air being convected in a substantially tangential path through said housing and creating a substantial air flow in an area outside said housing, filter retention means for removably engaging a filter membrane against a curved surface of said curved rear wall and across said inlet opening to totally cover said inlet opening whereby air is only drawn through the filter, said filter membrane being capable of holding its shape when held in position against said curved surface, said curved surface being outwardly curved whereby said filter membrane delineates a convex shape against ambient air being drawn in said inlet opening.

2. A vertical fan and filter as claimed in claim 1 wherein said filter retention means is a detachable filter retention frame having openings for the passage of air and detachably securable about said inlet opening.

3. A vertical fan having an air filter as claimed in claim 2 wherein said filter retention member is provided with filter holding means along at least opposed inner vertical sides of said openings, said filter holding means being in abutment with at least portions of opposed side edges of said filter membrane.

4. A vertical fan having an air filter as claimed in claim 3 wherein said filter membrane is a rectangular shaped flat flexible filter membrane.

5. A vertical fan having an air filter as claimed in claim 3 wherein said filter holding means is provided by one or more straight side abutment ribs disposed along said opposed vertical sides of said openings, said filter when subjected to said air being drawn in said inlet opening undergoing an air compression force against its convex shaped outer surface, said compression force being arrested by said side abutment ribs.

6. A vertical fan having an air filter as claimed in claim 5 wherein said side abutment ribs are also provided with an upper inwardly projecting rib spaced from an inner surface of said filter retention member and defining thereunder a filter retention channel to receive a vertical side edge portion of said filter membrane captive therein.

7. A vertical fan having an air filter as claimed in claim 5 wherein said filter holding means is further provided with top and bottom positioning and retention ribs disposed along a top and bottom horizontal side of said openings, said side abutment ribs and top and bottom positioning and retention ribs being spaced apart a predetermined distance to receive a rectangular shaped filter membrane in close friction fit therebetween.

8. A vertical fan having an air filter as claimed in claim 7 wherein said filter membrane is in compression friction fit between at least said side abutment ribs in order to maintain the filter curved in compression against said inlet opening and inner wall, whereby to present a resisting force against said compression force.

9. A vertical fan having an air filter as claimed in claim 7 wherein said filter membrane is constituted by a homogeneous flat flexible sheet of synthetic washable air filtering material.

10. A vertical fan having an air filter as claimed in claim 7 wherein said filter membrane is constituted by a composite filter sheet having a flexible contour frame and a filter sheet, and finger engagement means for ease of location and removal of said locating ribs in said locating channels.

11. A vertical fan having an air filter as claimed in claim 3 wherein said filter retention member is constituted by a flat flexible plastic frame member having engageable means for removably securing on an outer surface of said curved rear wall over said inlet opening.

12. A vertical fan having an air filter as claimed in claim 11 wherein said flexible plastic frame member is provided with spaced transverse ribs to define a plurality of slot openings to protect said filter sheet clamped therebehind.

13. A vertical fan having an air filter as claimed in claim 1 wherein said filter retention means is constituted by filter holding ribs disposed along opposed vertical sides of said inlet opening and projecting from an inner surface of said curved detachable rear wall, said ribs being disposed such that at least portions of opposed side edges of said filter membrane are in friction fit therewith to hold said filter membrane in an arcuate shape in pressure against said inner curved surface.

14. A vertical fan having an air filter as claimed in claim 13 wherein there is further provided a flexible filter retention frame detachably positioned over said filter membrane and retained by said filter holding ribs.

15. A vertical fan having an air filter as claimed in claim 14 wherein said filter retention frame has a contour frame and spaced transverse ribs to apply a retention force against inner surface portions of said filter membrane to hold it captive against said inner curved surface and across said inlet opening between said vertical holding ribs.

16. A vertical fan having an air filter as claimed in claim 15 wherein said contour frame is provided with locating ribs in opposed vertical side frame sections to be engaged in respective locating channels formed with said filter holding ribs.

17. A vertical fan having an air filter as claimed in claim 1 wherein said vertical fan is a free-standing vertical blowing fan, said support means being a support foot plate secured to a base of said housing.

18. A vertical fan having an air filter as claimed in claim 1 wherein said fan is a cylinder blowing fan having a plurality of curved fan blades.

* * * * *